United States Patent [19]
Okada et al.

[11] Patent Number: 6,027,836
[45] Date of Patent: Feb. 22, 2000

[54] NONAQUEOUS POLYMER CELL

[75] Inventors: Mikio Okada; Hideo Yasuda, both of Kyoto, Japan

[73] Assignee: The Japan Storage Battery Co., Ltd., Kyoto, Japan

[21] Appl. No.: 08/637,600

[22] Filed: Apr. 25, 1996

[51] Int. Cl.[7] ...................................................... H01M 6/18
[52] U.S. Cl. .......................... 429/314; 429/306; 429/316; 429/231.8; 429/324
[58] Field of Search ..................................... 429/188, 191, 429/194, 192, 197, 306, 314, 316, 231.8, 324

[56] References Cited

U.S. PATENT DOCUMENTS

| | | | |
|---|---|---|---|
| 3,214,501 | 10/1965 | Strauss | 264/49 |
| 3,640,829 | 2/1972 | Elton | 161/159 |
| 4,247,498 | 1/1981 | Castro | 264/41 |
| 4,346,142 | 8/1982 | Lazear | 428/315.7 |
| 4,539,256 | 9/1985 | Shipman | 428/315.5 |
| 5,183,715 | 2/1993 | North | 429/192 |
| 5,240,790 | 8/1993 | Chuo et al. | 429/190 |
| 5,296,318 | 3/1994 | Gozdz et al. | 429/192 |
| 5,498,489 | 3/1996 | Dasgupta et al. | 424/152 |

FOREIGN PATENT DOCUMENTS

| | | |
|---|---|---|
| 0730316 | 9/1996 | European Pat. Off. . |
| 9015838 | 12/1990 | WIPO . |

OTHER PUBLICATIONS

Database WPI, Section Ch, Week 9640, Derwent Publications, Ltd., London, GB; class A14, AN 96–399200 XP002016766 for JP–A–08 195 220 (Japan Storage Battery Co., Ltd.), Jul. 30, 1996.

"Impedance Studies for Separators in Rechargeable Lithium Batteries"; Laman et al., J. Electrochem. Soc.; vol. 140, No. 4, Apr. 1993; L51–L53.

"Li[+] Conductive Solid Polymer Electrolytes with Liquid–Like Conductivity"; Abraham et al.; EIC Laboratories; pp. 1657–1658, May 1990.

"A Polyacrylonitrile–based Gelled Electrolyte: Electrochemical Kinetic Studies"; Nagasubramanian et al; Journal of Applied Electrochemisty 24 (1994); 298–302 (month N/A).

"A Mechanism of Ionic Conduction of Poly (Vinylidene Fluoride)–Lithium Perchlorate Hybrid Films"; Tsunemi et al.; Electrochimica Acta. vol. 28, No. 6, pp. 833–837 (month N/A) 1991.

"Conduction of Lithium Ions in Polyvinylidene Fluoride and its Derivatives–I"; Tsuchida et al.; Electrochimica Acta. vol. 28, No. 5; pp. 591–595 (month N/A) 1991.

"Li Ion Conductive Electrolytes Based on Poly(vinyl chloride)", Alamgir et al., J. Electrochem. Soc., vol. 140, No. 6, Jun. 1993; L96–L97.

"Preparation and Characterization of Poly(Vinyl Sulfone)– and Poly (Vinylidene Fluoride)–Based Electrolytes", Choe et al., Electrochimica Acta, vol. 40, No. 13–14, pp. 2289–2293, 1989 month (N/A).

(List continued on next page.)

*Primary Examiner*—John S. Maples
*Attorney, Agent, or Firm*—Sughrue, Mion, Zinn, Macpeak & Seas, PLLC

[57] ABSTRACT

A nonaqueous polymer cell according to the present invention contains a lithium ion conductive polymer having a porosity in the range of 10% to 80%. In the cell of the present invention, the electrolyte is held not only in the pores of the microporous polymer but also within the polymer itself. Consequently, lithium ions can move not only through the pores of the microporous polymer film but through the polymer itself. The cell of the present invention, which contains a microporous polymer having interconnected pores, shows greatly improved high-rate charge/discharge characteristics especially when the microporous polymer is used in combination with an electrode comprising an active material which expands and contracts upon charge and discharge, because volume changes of the active material cause flows of the electrolyte through the pores of the microporous polymer and the flows carry lithium ions.

26 Claims, 4 Drawing Sheets

OTHER PUBLICATIONS

"Room Temperature Polymer Electrolytes and Batteries Based on Them"; Abraham et al., Solid State Ionics, 70/71, (1994), pp. 20–26 (month N/A).

"Ionic Conductivity of Dual–Phase Polymer Electrolytes Comprised onf NBR/SBR Latex Films Swollen with Lithium Salt Solutions", Matsumoto et al., J. Electrochem. Soc., vol. 141, No. 8, Aug. 1994 pp. 1989–1993.

"Ion–Free Latez Films Composed of Fused Polybutadiene and Poly(Vinyl Pyrrolidone) Particles as Polymer Electrolyte Materials", Rutt et al., Journal of Polymer Science: Part A: Polymer Chemistry, vol. 32, 779–787 (1994) month N/A).

"Polymer Electrolytes Reinforced by Celgard Membranes", Abraham et al., J. Electrochem. Soc., vol. 142, No. 3, Mar. 1995, pp. 683–687.

"Polymer–Ceramic Composite Electrolytes", Kumar et al., Journal of Power Sources, 52, (1994) 261–268.

"Effective Medium Theory in Studies of Conductivity of Composite Polymeric Electrolytes", Przyluski et al., Electrochimica Acta, vol. 40, No. 13–14, pp. 2101–2108, 1995 (No Month).

"The Sei Model–Application to Lithium–Polymer Electrolyte Batteries", Peled et al., Electrochimica Acta, vol. 40, No. 13 14, pp. 2197–2204 (1995) Month N/A).

NONAQUEOUS POLYMER CELL

BACKGROUND OF THE INVENTION

1. Field of the Invention

The present invention relates to a nonaqueous polymer cell, and it particularly relates to a nonaqueous lithium cell having a lithium ion conductive polymer.

2. Description of the Related Art

Accompanying with the recent innovation in electronic appliances, the advent of a new high-performance cell is expected. The batteries used as electric power sources in present-day electronic appliances mainly are primary batteries such as manganese dioxide-zinc cells and secondary batteries such as lead acid cells and alkaline cells, e.g., nickel-cadmium cells, nickel-zinc cells, and nickel metal hydride cells.

As the electrolyte of these batteries, an alkaline solution, e.g., potassium hydroxide, or water sulfuric acid solution or the like is used. The theoretical water decomposition voltage is 1.23 V. If a battery system is designed so as to have a potential higher than that value, water decomposition is to occur and stable storage of electrical energy is difficult. Accordingly, batteries of the above kinds which have been put to practical use have an electromotive force about 2 V at the most. Consequently, 3-V and higher-voltage batteries should employ a nonaqueous electrolyte. A representative example thereof is the so-called lithium cells using a negative electrode containing metallic lithium.

For example, as lithium primary batteries, there are manganese dioxide-lithium cells and carbon fluoride-lithium cells, while as lithium secondary batteries, there are manganese dioxide-lithium cells and vanadium oxide-lithium cells.

The second batteries having the negative electrode containing lithium metal are apt to occur a short circuit due to the dendritic deposition of metallic lithium metal, so that their cycle life is short. In addition, because of the high reactivity of metallic lithium, it is difficult to ensure safety. For these reasons, the so-called lithium ion cell has been commercialized which employs graphite or carbon in place of lithium metal and employs lithium cobaltate or lithium nickelate as the positive active material. There recently is a requirement for a highly safe cell having higher performance with increasing demand as high energy-density cells.

In lithium cells and lithium ion cells (hereinafter collectively referred to as lithium cells), most of the lithium ion participating in electrode reactions during charge and discharge are not the lithium ion which is originally dissolved in the electrolyte but the lithium ion which is released from the active material of an electrode and reaches the opposite electrode through the electrolyte. The lithium ion hence moves a long distance. In addition, the transport number at room temperature of lithium ion in the electrolyte in lithium cell is usually 0.5 or lower, while the transport number of proton and hydroxide ion in aqueous-solution-electrolyte cells is nearly unit. The moving speed of lithium ion in an electrolyte strongly depend on the diffusion of the ion. Since organic electrolytes have a higher viscosity than aqueous solutions, the diffusion of ion is slow. Therefore, the lithium cells have a problem that they are inferior in high-rate charge/discharge performance to cells employing an aqueous electrolyte.

In the lithium cells described above, a microporous film made of, e.g., polyethylene or polypropylene is used as a separator. For producing such microporous films, a casting-extraction process and a stretching process are mainly used. The wet process is a process for producing a non-directional microporous polymer film in which a polymer is dissolved into a liquid, the solution is spread into a sheet, and the sheet is immersed in a bath to remove the liquid serving as a solvent for the polymer and to thereby form pores (U.S. Pat. No. 4,539,256). This microporous film separator having circular or elliptic pores is used in closed nickel-cadmium cells (U.S. Pat. No. 5,069,990). In the stretching process, a microporous film is produced by stretching a polymer film to form directional pores therein (U.S. Pat. No. 4,346,142), and this microporous film is extensively used in secondary batteries. In another process, fine particles of salt, starch, or the like is added to a polymer, the mixture is formed into a sheet, and then the fine particles are dissolved into a liquid to remove the same to thereby produce a microporous polymer film (U.S. Pat. Nos. 3,214,501 and 3,640,829). Another process for producing a microporous polymer film comprises dissolving a polymer into a liquid at a high temperature, cooling the solution to solidify the polymer, and then removing the solvent (U.S. Pat. Nos. 4,247,498 and 4,539,256). By utilizing a shutdown effect in which the pores of the microporous polymer film are closed upon thermal fusion of the film, a separator is served as a safety device for the cell. (J. Electrochem. Soc. 140(1993)L51). Even if this cell comes into a dangerous state as a result of heat generation caused by internal short circuit in the cell, the safety device functions to insulate the positive electrode from the negative to thereby inhibit further reactions at the positive and negative electrodes.

Lithium cells have a problem concerning their safety because of the use of a flammable organic electrolyte as the electrolyte, unlike the batteries employing an aqueous electrolyte, such as lead storage batteries, nickel-cadmium cells, and nickel metal hydride cells. Accordingly, a solid polymer electrolyte having lower chemical reactivity is used in place of the organic electrolyte so as to attempt to improve the safety thereof. (Electrochimica Acta, 40(1995)2117). Use of solid polymer electrolytes is being attempted also for the purposes of producing a flexible cell, simplification of cell fabricating steps, reduction of production cost, etc.

The ion conductive polymers which have been investigated so far is a large number of complexes of polyethers, e.g., polyethylene oxide and polypropylene oxide, with alkali metal salts. However, such polyethers is difficult to obtain high ionic conductivity while maintaining sufficient mechanical strength. Further, the conductivity thereof is considerably influenced by temperature and a sufficient conductivity cannot be obtained at room temperature. For these reasons, investigations have been made on a comb-shaped polymer having polyether side chains, a copolymer of a polyether chain with another kind of monomer, a polysiloxane or polyphosphazene having polyether side chains, a crosslinked polyether, and others.

In ion conductive polymers containing a salt dissolved therein, such as polyether-based polymer electrolytes, both cations and anions move and the transport number of cations at room temperature is usually 0.5 or lower. It has hence been attempted to synthesize a polymer electrolyte type ion conductive polymer which has anionic groups such as $—SO_3^-$ or $—COO^-$ and in which the transport number of lithium ions is unit. However, since lithium ions are strongly attracted by such anionic groups, that polymer has a considerably low ionic conductivity, making it very difficult to use the same in a lithium cell.

It has also been attempted to impregnate a polymer with an electrolyte to produce a gel-state solid electrolyte for use in a lithium cell. Examples of the polymer used in this gel-state solid electrolyte include polyacrylonitrile (J. Electrochem. Soc., 137(1990)1657; and J. Appl. Electrochem., 24(1994)298), polyvinylidene fluoride (Electrochimica Acta, 28(1983)833, 28(1993)591), polyvinyl chloride (J. Electrochem. Soc., 140(1993)L96), polyvinyl sulfone (Electrochimica Acta, 40(1995)2289; and Solid State Ionics, 70/71(1994)20), and polyvinylpyrrolidinone. An attempt has been made to facilitate the infiltration of an electrolyte by using a vinylidene fluoride-hexafluoropropylene copolymer having a reduced crystallinity to thereby improve conductivity (U.S. Pat. No. 5,296,318). It has further been attempted to produce a polymer film by drying a latex of a nitrile rubber, styrene-butadiene rubber, polybutadiene, polyvinylpyrrolidone, or the like and impregnate this film with an electrolyte to produce a lithium ion conductive polymer film (J. Electrochem. Soc., 141(1994)1989; and J. Polym. Sci., A 32(1994)779). In connection with this polymer electrolyte production from a latex, a polymer film designed to combine mechanical strength and ionic conductivity has been proposed which is produced from a mixture of two polymers and has a mixed polymer phase consisting of a polymer phase less impregnable with an electrolyte but having high mechanical strength and a polymer phase easily impregnable with an electrolyte and showing a high ionic conductivity.

Furthermore, reports have been made on a solid electrolyte which comprises a microporous polyolefin film with its pores being filled with a polymer electrolyte so as to improve the mechanical strength and handleability of polymer electrolyte films (J. Electrochem. Soc., 142(1995)683), and on a polymer electrolyte containing inorganic solid electrolyte particles so as to attain an improvement in ionic conductivity, an increase in the transport number of cations, etc. (J. Power Sources, 52(1994)261; and Electrochimica Acta, 40(1995)2101, 40(1995)2197).

Although a large number of various polymer separators and polymer electrolytes have been proposed as described above, there has been no functional film which has essentially overcome the problem concerning the diffusion of lithium ions. Consequently, the performance of batteries containing a nonaqueous electrolyte has been unsatisfactory as compared with batteries containing an aqueous electrolyte.

SUMMARY OF THE INVENTION

It is an object of the present invention to provide a nonaqueous polymer cell which contains a lithium ion conductive porous polymer and has satisfactory high-rate charge/discharge characteristics even at low temperatures.

The nonaqueous polymer cell of the present invention contains, as the electrolyte thereof, a lithium ion conductive polymer having a porosity of from 10 to 80% in place of an insulating film impermeable to lithium ions or of a lithium ion conductive polymer in which the rate of ion diffusion is low.

Use of the lithium ion conductive porous polymer is based on a completely new principle. According to the present invention, high-rate charge/discharge characteristics are greatly improved.

DETAILED DESCRIPTION OF THE INVENTION

Figure 1:
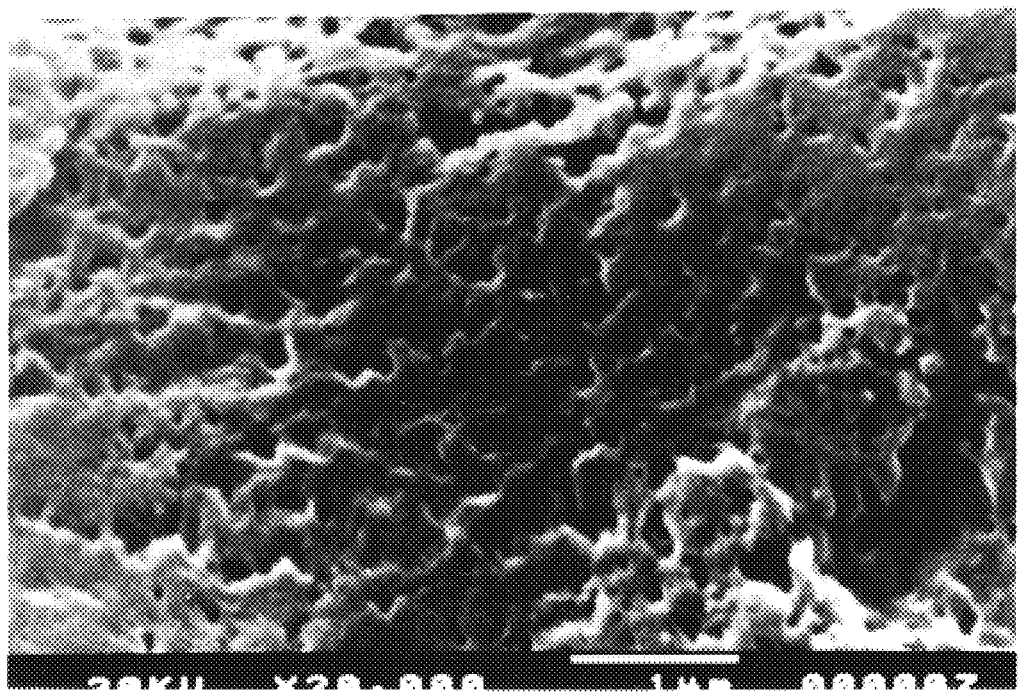
FIG. 1 is an SEM photograph of the microporous PVDF polymer used in cell (A) according to the present invention produced in Example 1.

Detailed description of the present invention will be described referring to the accompanying drawings as follows.

In conventional lithium cells using a liquid electrolyte, a porous polymer film made of, e.g., polypropylene or polyethylene is used as a separator, and lithium ion conduction path are ensured with an electrolyte held in the pores of the film. In this case, the separator is an insulator with respect to ion conduction and constitutes a barrier in high-rate charge and discharge. On the other hand, lithium cells containing a non-porous polymer electrolyte have a drawback of significantly poor charge/discharge performance because the rate of the diffusion of cations and anions in the polymer electrolyte is even lower.

The cell of the present invention can be regarded as a conventional lithium cell in which the separator not having lithium ion conductivity or the non-porous polymer electrolyte has been replaced with a lithium ion conductive porous polymer containing an organic electrolyte in the pores thereof. The cell of the present invention can be charged and discharged at a higher rate than the conventional lithium cells employing a liquid electrolyte, because in the cell of this invention, lithium ions can pass not only through the electrolyte but also through the polymer electrolyte. Furthermore, the cell of the present invention is superior in high-rate charge/discharge characteristics to the conventional lithium cells containing a polymer electrolyte, because in the cell of this invention, path through which ions diffuse rapidly is established by the electrolyte held in the pores of the porous polymer electrolyte.

When the active material layer of the positive or negative electrode contains the lithium ion conductive porous polymer in the pores thereof to fill the interface between the electrode and the electrolyte with the lithium ion conductive porous polymer, not only the oxidation and reduction of the organic electrolyte caused by the positive and negative electrodes respectively, which is a problem characteristic of high-voltage cells, can be reduced to improve charge/discharge characteristics, but also cell safety is improved. In this case also, high-rate charge/discharge is possible due to the porosity of the lithium ion conductive polymer through which lithium ion easily diffuses. The presence of the porous polymer in the pores of an active material layer is also effective in greatly reducing the amount of the electrolyte contained in the pores of the active material layer. Consequently, when an active material which repeatedly expands and contracts upon charge/discharge cycling is used as the positive or negative electrode, the expansion and contraction of the active material accelerates the electrolyte flow through the pores of the lithium ion conductive porous polymer, whereby lithium ions are diffused by the flow to a longer distance. Therefore, lithium ions move smoothly through the electrolyte and, as a result, the cell has improved high-rate charge/discharge performance.

EXAMPLE 1

A positive electrode was produced as follows. First, a mixture of 70 wt % lithium cobaltate, 6 wt % acetylene black, 9 wt % polyvinylidene fluoride (PVDF), and 15 wt % n-methyl-2-pyrrolidone (NMP) was applied to a stainless-steel sheet having a width of 20 mm, a length of 480 mm, and a thickness of 20 $\mu$m, and the coating was dried at 150° C. to vaporize the NMP. Both sides of the stainless-steel sheet were coated by carrying out the above procedure. The coated sheet was pressed to obtain a positive electrode having a thickness of 170 $\mu$m. In the electrode, the amount of the active material, conductive material, and binder per unit area was 23 $\mu$g/cm$^2$.

A negative electrode was produced as follows. A mixture of 81 wt % graphite, 9 wt % PVDF, and 10 wt % NMP was applied to a nickel sheet having a thickness of 14 $\mu$m, and the coating was dried at 150° C. to vaporize the NMP. Both sides of the nickel sheet was coated by carrying out the above procedure. The coated sheet was pressed to obtain a negative electrode having a thickness of 190 $\mu$m.

A lithium ion conductive porous polymer was then produced as follows. 12 g of a powder of poly(vinylidene fluoride) (PVDF) having a molecular weight of 60,000 was dissolved in 88 g of NMP. This solution was casted in water to extract the NMP. Thus, casting-extraction wet-process microporous PVDF films with a thickness of 30 $\mu$m were produced which had porosities of 10%, 20%, 30%, 40%, 50%, 60%, 70%, and 80% respectively. An SEM photograph of the microporous PVDF polymer film having porosity of 60% is shown in FIG. 1. This photograph shows the presence of circular pores on the film surface.

Each of the thus-prepared microporous PVDF polymer films was interposed between the positive electrode and the negative electrode, and the resulting assemblage was rolled up and inserted in a stainless-steel case having a height of 47.00 mm, a width of 22.2 mm, and a thickness of 6.4 mm to fabricate a prismatic cell. An electrolyte prepared by adding 1 mol/l LiPF$_6$ to a 1:1 by volume mixture of ethylene carbonate (EC) and diethyl carbonate (DEC) was introduced in an amount of 2.5 g into each cell in a vacuum to swell the microporous PVDF polymer with the electrolyte, thereby giving a lithium ion conductive microporous polymer electrolyte. Thus, eight cells (A) which had porosities of 10%, 20%, 30%, 40%, 50%, 60%, 70%, and 80%, respectively, of Example 1 according to the present invention was produced which had a nominal capacity of about 400 mAh. Wettability by the electrolyte can be controlled by using PVDF's having different molecular weights.

In Comparative Example 1, eight cells (B) having a conventionally known constitution and a nominal capacity of about 400 mAh was produced the constitution of which was the same as that of the cells of Example 1, except that 30 $\mu$m-thick polypropylene films having various porosities were used in place of the lithium ion conductive porous polymer films.

Figure 2:
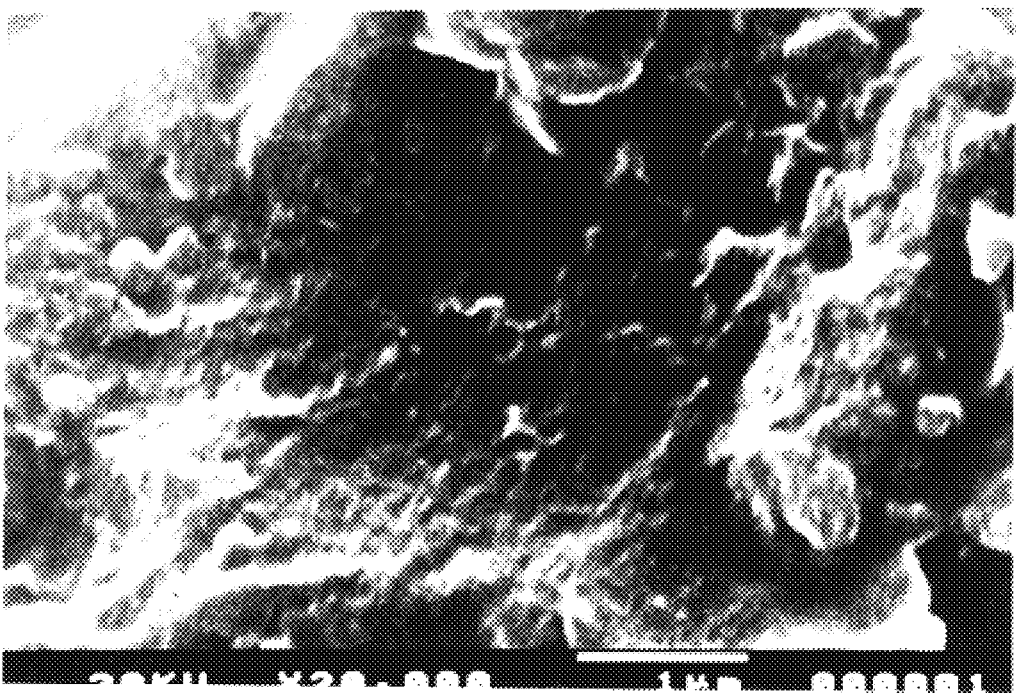
FIG. 2 is an SEM photograph of the non-porous PVDF polymer used in cell (C), a conventionally known cell, produced in Comparative Example 2.

In Comparative Example 2, a cell (C) having a conventionally known constitution and a nominal capacity of about 400 mAh was produced the constitution of which was the same as the cells of Example 1, except that a dry-process non-porous PVDF film was used in place of the microporous PVDF polymer films. The dry-process non-continuous pore PVDF film was produced as follows. 12 g of a powder of polyvinylidene fluoride (PVDF) having a molecular weight of 60,000 was dissolved in 88 g of NMP. This solution was thinly spread on paper, and the solution was dried at 85° C. for 1 hour to produce the dry-process non-continuous pore PVDF film which had a thickness of 30 $\mu$m. No continuous pores were observed on the surface thereof. An SEM photograph of this non-continuous porous PVDF polymer film is shown in FIG. 2.

At a temperature of −10° C., the thus-produced cells (A), (B), and (C) were charged to 4.1 V at a current of 1 CA, subsequently charged at a constant voltage of 4.1 V for 2 hours, and then discharged to 2.5 V at a current of 1 CA.

Figure 3:
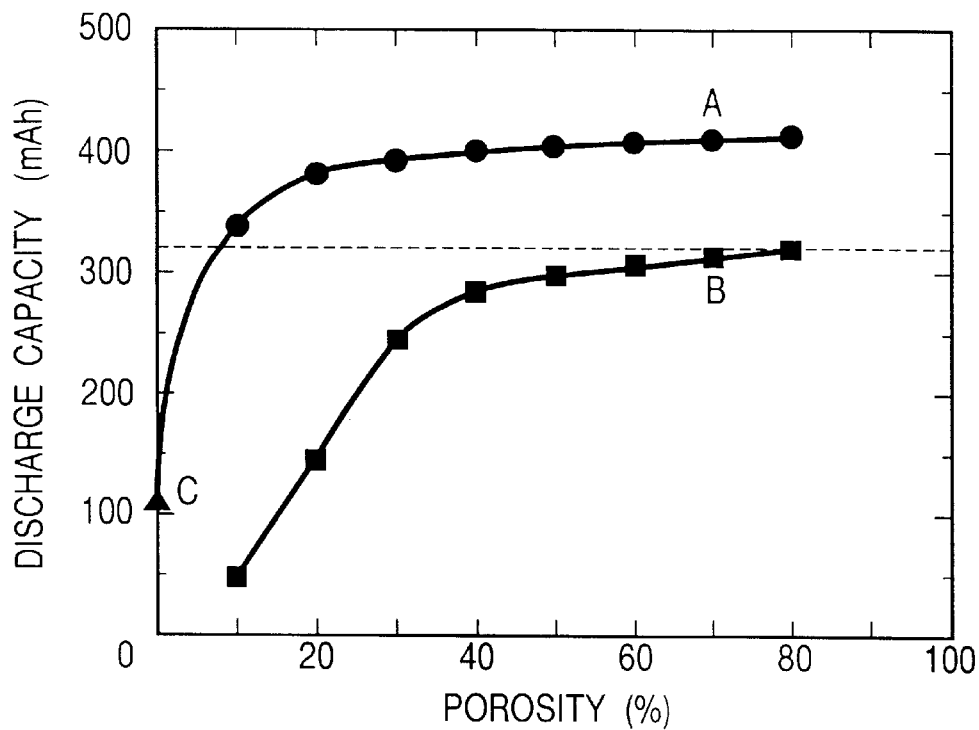
FIG. 3 is a graph showing the relationship between porosity and discharge capacity in cells (A) according to the present invention produced in Example 1 and conventional cells (B) and cell (C) produced in Comparative Examples.

FIG. 3 shows graphs which represent the relationship between the discharge capacity of these cells and the porosity of the polymer electrolyte or separator used in the lithium ion cells. As seen from FIG. 3, cells (A) according to the present invention, in which the lithium ion conductive polymers had porosities ranging from 10% to 80%, were superior in discharge capacity to any of cells (B), which are conventionally known cells employing not a lithium ion conductive polymer but a polypropylene film.

It is noted that higher porosities of the polymer electrolyte and of the separator tend to result in the greater possibility of internal shortcircuiting, etc. In view of this tendency, the importance of the present invention is understood from the result that the cell (A) having a polymer electrolyte porosity of 10%, according to the present invention, showed a better discharge capacity than the cell (B) of Comparative Example 1 having a separator porosity of 80%.

Figure 4:
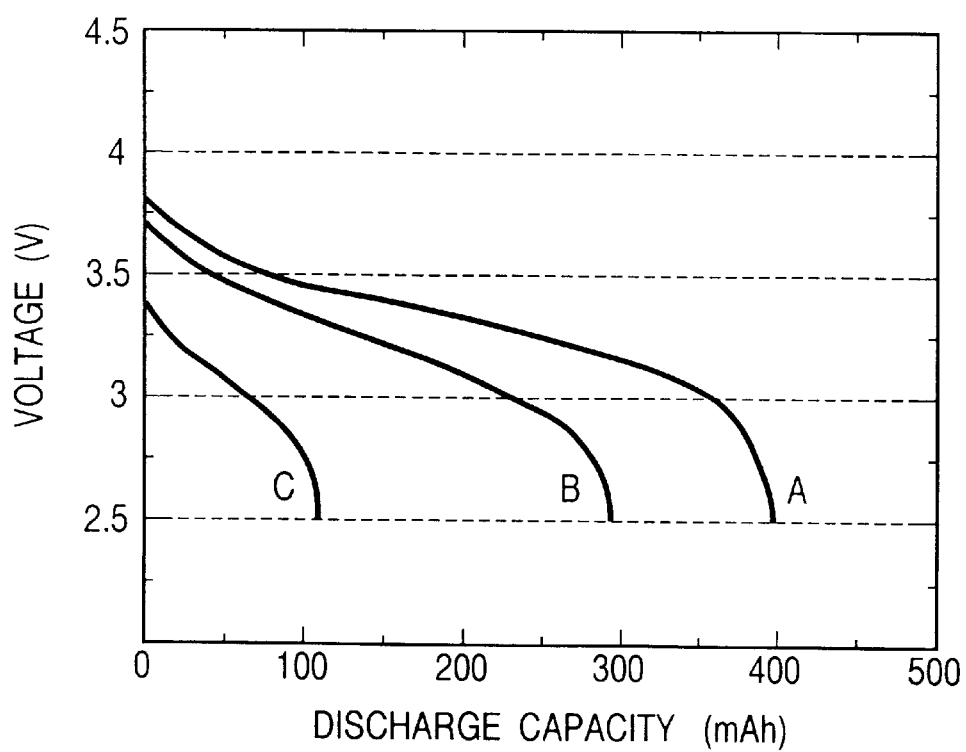
FIG. 4 is a graph showing the discharge characteristics of cells (A) according to the present invention produced in Example 1 and of conventional cells (B) and cell (C) produced in Comparative Examples.

FIG. 4 shows a comparison in discharge characteristics among the cell (A) of Example 1 having a porosity of 40%, the cell (B) of Comparative Example 1 having a porosity of 40%, and cell (C) of Comparative Example 2, employing a non-continuous pore film. This comparison was made through the same experiment as that which gave the results shown in FIG. 3. It is understood from FIG. 4 that the cell (A) according to the present invention was superior in low-temperature discharge characteristics to the cell (B) and cell (C), which are conventionally known cells.

EXAMPLE 2

A positive electrode was produced in the same manner as in Example 1, except that lithium nickelate was used as a positive active material in place of lithium cobaltate. A negative electrode was produced in the same manner as in Example 1.

Figure 5:
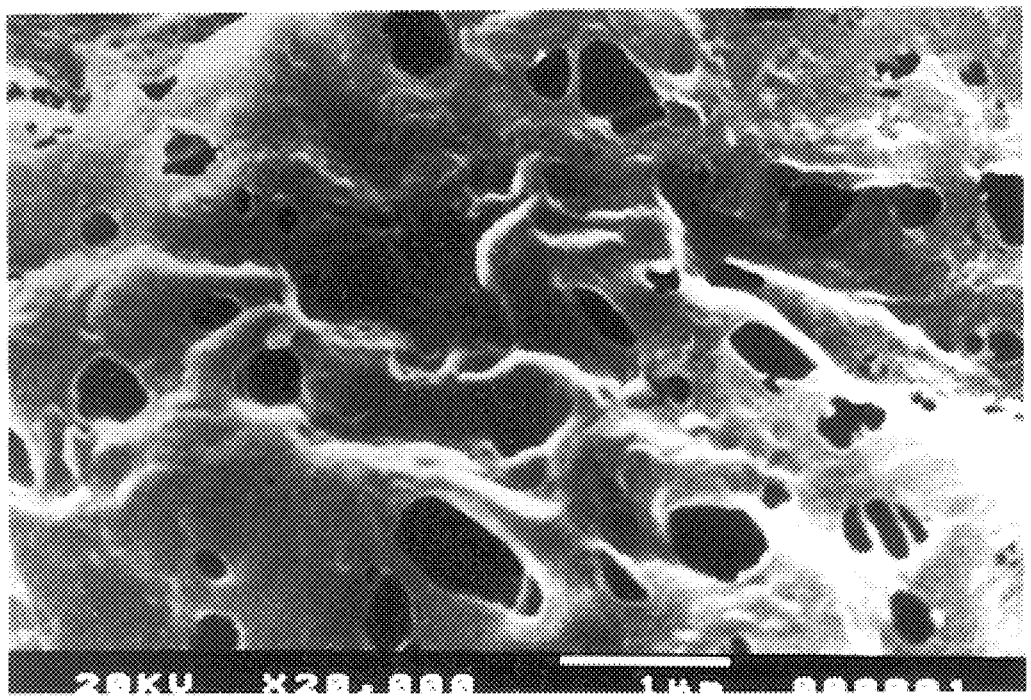
FIG. 5 is an SEM photograph of the microporous PVC polymer used in cell (D) according to the present invention produced in Example 2.

A lithium ion conductive porous polymer was then produced as follows. 12 g a powder of polyvinyl chloride (PVC) having a molecular weight of 800 was dissolved in 88 g of NMP. This solution was applied to the positive and negative electrodes in a vacuum to fill the pores of the active material layers with the solution. The coated electrodes were immersed in water to wash out the NMP. As a result of this wet process, the pores of the active material layers of the positive and negative electrodes were filled with a microporous PVC polymer having a porosity of 40%. An SEM photograph of this microporous PVC polymer is shown in FIG. 5. The photograph shows the presence of circular pores on the polymer surface.

A conventionally known polyethylene separator having a porosity of 40% and a thickness of 30 μm was interposed between the thus-prepared positive and negative electrodes coated with the microporous PVC polymer film. The resulting assemblage was rolled up and inserted in a stainless-steel case having a height of 47.00 mm, a width of 22.2 mm, and a thickness of 6.4 mm to fabricate a prismatic cell. An electrolyte prepared by adding 1 mol/l $LiPF_6$ to a 1:1 by volume mixture of ethylene carbonate (EC) and diethyl carbonate (DEC) was introduced in an amount of 2.5 g into the cell in a vacuum to swell the microporous PVC polymer with the electrolyte, thereby giving a lithium ion conductive microporous polymer electrolyte. Thus, a cell (D) of Example 2 according to the present invention was produced which had a nominal capacity of about 400 mAh.

In Comparative Example 3, a cell (E) having a conventionally known constitution and a nominal capacity of about 400 mAh was produced the constitution of which was the same as that of the cell of Example 2, except that the positive and negative electrodes coated with the PVC solution was not immersed in water but dried at 85° C. for 1 hour to fill, by this dry process, the pores of the active material layers of the positive and negative electrodes with a non-porous PVC polymer having a non-continuous pore.

Figure 6:
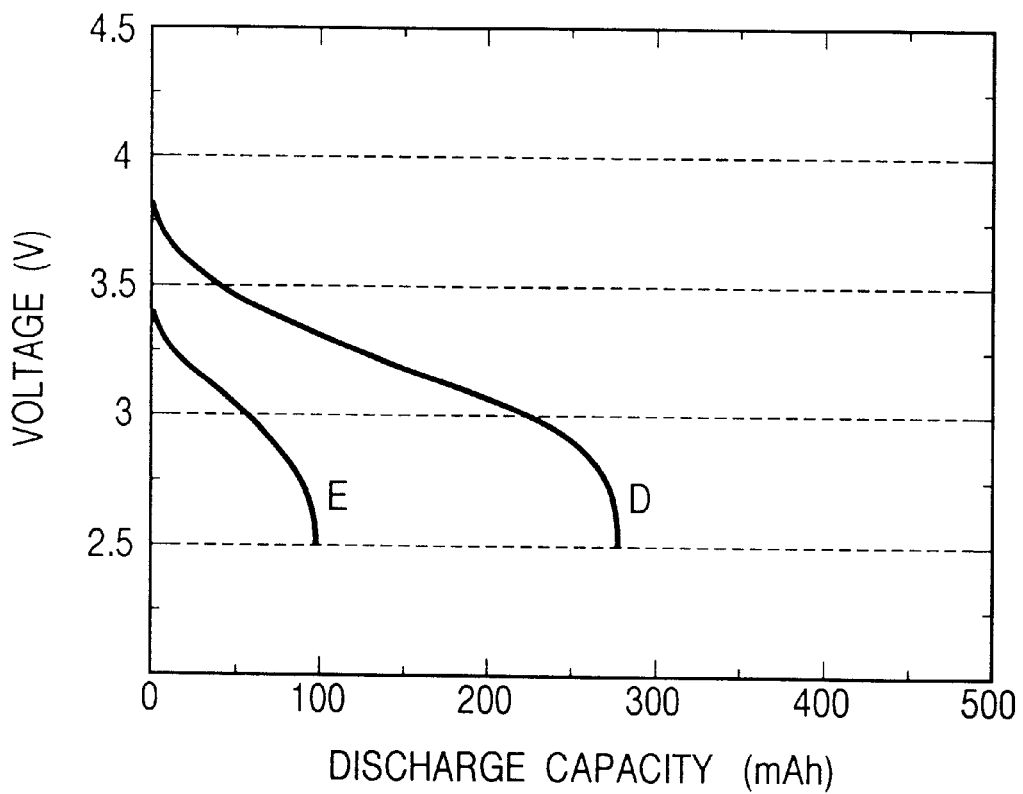
FIG. 6 is a graph showing the discharge characteristics of cell (D) according to the present invention produced in Example 2 and of conventional cell (E) produced in a Comparative Example.

At a temperature of −10° C., the thus-produced cells (D) and (E) were charged to 4.1 V at a current of 1 CA, subsequently charged at a constant voltage of 4.1 V for 2 hours, and then discharged to 2.5 V at a current of 1 CA. FIG. 6 shows a comparison of the thus-determined discharge characteristics of cell (D) of Example 2, having a porosity of 40%, with those of cell (E) of Comparative Example 3, employing a non-porous polymer. It is understood from FIG. 6 that cell (D) according to the present invention was superior in low-temperature discharge characteristics to cell (E), which is a conventionally known cell.

Cell (D) of Example 2 according to the present invention and cells (B) of Comparative Example 1, which are conventionally known cells, were subjected to the following test for safety comparison. These cells differed only in that in cell (D) the pores of the active material layers of the positive and negative electrodes were filled with an ion-conductive microporous polymer, whereas in cells (B) the pores of the active material layers were not filled with its polymer and the active material layers contained a large amount of an organic electrolyte. At room temperature, cell (D) and cells (B) were charged to 4.5 V at a current of 1 CA and then charged at a constant voltage of 4.1 V for 2 hours. Thereafter, a nail having a diameter of 3 mm was stuck to penetrate each cell. As a result, in cell (D) according to the present invention, the safety valve worked and smoking did not occur. In contrast, in cells (B), which are conventionally known cells, the safety valve broke and smoking occurred.

These results show that cell (D) according to the present invention was superior in both low-temperature discharge characteristics and safety.

In the Examples given above, the ion-conductive microporous polymer films were produced by dissolving a polymer in NMP and immersing the solution in water to remove the NMP. However, the solvent for dissolving the polymer is not limited to NMP, and any solvent may be used as long as the polymer dissolves therein. Further, the liquid in which the polymer solution is immersed is not limited to water, and any liquid may be used as long as it is not compatible with the polymer but compatible with the solvent in which the polymer is dissolved. When such a combination of a polymer, a solvent for the polymer, and an immersion liquid for a polymer solution is used to remove the solvent from the polymer solution, the parts which have been occupied by the solvent turn into pores, whereby a microporous polymer film can be produced.

Besides the wet process described above, other methods were used to produce a porous polymer for use in producing a porous polymer electrolyte. These methods used were: the stretching method; a method in which fine particles added to a polymer beforehand are removed; a method in which a heated polymer solution is cooled to solidify the polymer to thereby remove the solvent; and a method in which a non-porous polymer film is produced and then through-holes are physically formed therein with a thin stainless-steel needle. Of the porous films produced by these methods, the porous film produced by the method using a thin stainless-steel needle gave a cell showing excellent charge/discharge characteristics, like the porous polymer films produced by the wet process. However, the other methods failed to give a porous polymer film having a sufficient porosity.

Figure 7:
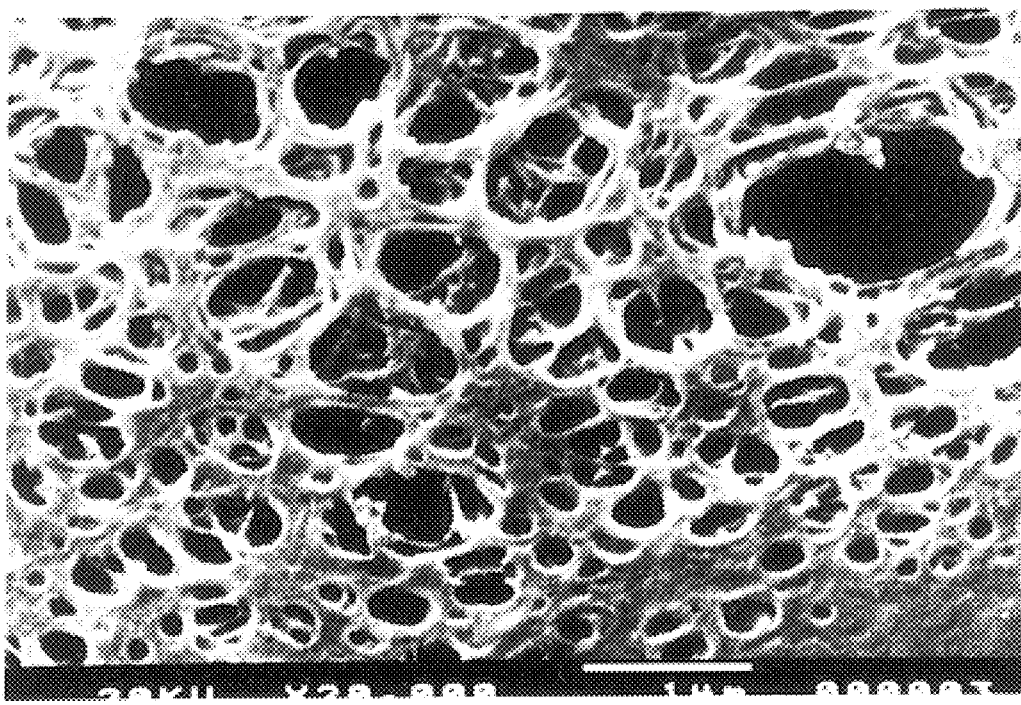
FIG. 7 is an SEM photograph of a microporous PAN polymer produced by a casting extraction process.

Besides the PVDF and PVC described above, other polymers were used to produce a porous polymer electrolyte. Namely, it was attempted to use polyacrylonitrile (PAN), polyethylene oxide, polypropylene oxide, polymethyl methacrylate, polymethyl acrylate, polyvinyl alcohol, polymethacrylonitrile, polyvinyl acetate, polyvinylpyrrolidone, polyethylenimine, polybutadiene, polystyrene, and polyisoprene to produce porous polymer electrolytes. It was further attempted to use these porous polymer electrolytes to fabricate cells. Of the porous polymer electrolytes thus produced, the PVDF, PVC, and PAN electrolytes were especially superior. An SEM photograph of a microporous polymer obtained from PAN by the wet process is shown in FIG. 7. The figure shows the presence of circular pores on the polymer surface.

Although polyvinylidene fluoride and polyvinyl chloride were used as the polymer in a polymer electrolyte in the Examples given above, usable electrolyte polymers are not limited thereto. Examples of usable polymers are polyethers such as polyethylene oxide and polypropylene oxide, polyacrylonitrile, polyvinylidene fluoride, polyvinyl chloride, polymethyl methacrylate, polymethyl acrylate, polyvinyl alcohol, polymethacrylonitrile, polyvinyl acetate, polyvinylpyrrolidone, polyethylenimine, polybutadiene, polystyrene, polyisoprene, and derivatives thereof. These polymers may be used alone or as a mixture thereof. Also usable are polymers obtained by copolymerizing any of the various monomers used for constituting those polymers.

In the Examples given above, an EC/DEC mixture was used as the organic electrolyte infiltrated into the polymers for improving lithium ion conductivity and incorporated into the pores of the lithium ion conductive organic polymers. However, the electrolyte is not limited thereto. Examples of usable electrolytes include polar solvents such as ethylene carbonate, propylene carbonate, dimethyl carbonate, diethyl carbonate, γ-butyrolactone, sulfolane, dimethyl sulfoxide, acetonitrile, dimethylformamide, dimethylacetamide, 1,2-dimethoxyethane, 1,2-diethoxyethane, tetrahydrofuran, 2-methyltetrahydrofuran, dioxolane, and methyl acetate, and mixtures thereof. The electrolyte infiltrated into the lithium ion conductive polymer may differ from the electrolyte incorporated into the pores of the polymer.

Further, although $LiPF_6$ was used in the Examples given above as the lithium salt infiltrated into the lithium ion conductive polymer and incorporated in the organic electrolyte, other lithium salts may be used such as, e.g., $LiBF_4$, $LiAsF_6$, $LiClO_4$, LiSCN, LiI, $LiCF_3SO_3$, LiCl, LiBr, and $LiCF_3CO_2$. Mixtures of these salts may also be used. The salt infiltrated into the ion conductive polymer may differ from the salt incorporated in the organic electrolyte.

In the Examples given above, $LiCoO_2$ and $LiNiO_2$ were used as a prelithiated compound which can release lithium as a positive active material and from which the occluded lithium can be released. However, the compound for positive active material is not limited to them. Examples of other usable inorganic compounds include mixed oxides represented by the empirical formula $Li_xMO_2$ or $Li_yM_2O_4$ (where M is a transition metal, $0 \leq x \leq 1$, and $0 \leq y \leq 2$), oxides having a tunnel-like channel, and metal-chalcogen compounds having a layer structure. Specific examples thereof are $LiCoO_2$, $LiNiO_2$, $LiMn_2O_4$, $Li_2Mn_2O_4$, $MnO_2$, $FeO_2$, $V_2O_5$, $V_6O_{13}$, $TiO_2$, and $TiS_2$. Examples of usable organic compounds include electrically conductive polymers such as polyaniline. These various active materials may be used as a mixture of two or more thereof irrespective of whether the compounds used in combination are inorganic or organic.

Furthermore, although graphite was used in the Examples given above as a compound serving as the negative active material, other materials can be used. Examples of usable negative active materials are alloys of lithium with Al, Si, Pb, Sn, Zn, Cd, etc., transition metal mixed oxides such as $LiFe_2O_3$ and $WO_3$, transition metal oxides such as $WO_2$ and $MoO_2$, carbonaceous materials such as graphite and carbon, lithium nitrides such as $Li_5(Li_3N)$, a lithium metal foil, and mixtures thereof.

In the present invention, the interface between the positive or negative electrode and the electrolyte is partly or wholly filled with a lithium ion conductive porous polymer. Consequently, the oxidation and reduction of the organic electrolyte caused by the positive and negative electrodes, which is a problem for high-voltage cells, could be reduced and improved charge/discharge characteristics could be obtained. In this case also, high-rate charge/discharge was possible due to the porosity of the lithium ion conductive polymer resulting in easiness of lithium ion diffusion.

As described above, the cell containing a nonaqueous electrolyte according to the present invention contains a lithium ion conductive polymer having a porosity in the range of 10% to 80%, and the interface between the positive or negative electrode and the electrolyte is partly or wholly filled with the lithium ion conductive porous polymer.

Due to this constitution in which an organic electrolyte can be incorporated in the pores of the lithium ion conductive polymer, lithium ions can pass not only through the electrolyte but through the polymer electrolyte. As a result, the cell can be discharged at a higher rate than the conventional lithium cells employing a liquid electrolyte. Furthermore, the cell of the present invention can be discharged at a higher rate than the conventional lithium cells employing a polymer electrolyte, because in the cell of this invention, paths through which ions diffuse rapidly is established by the electrolyte held in the pores of the porous polymer electrolyte.

Moreover, by partly or wholly filling the interface between the positive or negative electrode and the electrolyte with a lithium ion conductive porous polymer, the oxidation and reduction of the organic electrolyte caused by the positive and negative electrodes, which is a problem for high-voltage cells, can be reduced and improved charge/discharge characteristics can be obtained. In this case also, high-rate discharge is possible due to the porosity of the lithium ion conductive polymer.

Furthermore, in the case where an active material which repeatedly expands and contracts upon charge/discharge cycling, e.g., a positive active material comprising a layer-structure compound such as lithium cobaltate, lithium nickelate, or lithium ferrate or comprising a spinel compound such as lithium-manganese spinel or a negative active material with a layer structure comprising carbon or graphite, is used as the positive or negative electrode, and where a porous polymer is incorporated in the pores of the active material layer, the amount of the electrolyte contained in the pores of the active material layer can be greatly reduced and, hence, the expansion and contraction of the active material accelerates flows of the electrolyte through the pores of the lithium ion conductive porous polymer, whereby lithium ions are moved by the flows to a longer distance. Therefore, when the direction of these flows of the electrolyte is the same as the direction of the movement of lithium ions attributable to charge or discharge, lithium ions move smoothly through the electrolyte and the cell has improved high-rate charge/discharge performance. In the present invention, this principle is used in combination with the effect that the presence of a porous polymer electrolyte in the pores of the active material layer reduces the amount of the electrolyte contained in the pores of the active material layer. As a result, lithium ions move more smoothly and the cell has excellent high-rate charge/discharge performance.

Therefore, the polymer cell of the present invention is superior to conventional cells employing a nonaqueous electrolyte in low-temperature high-rate discharge performance, and long-term charge/discharge characteristics.

What is claimed is:

1. A nonaqueous polymer cell comprising a positive electrode, a negative electrode, a first nonaqueous electrolyte, and a lithium ion conductive porous polymer, wherein the lithium ion conductive porous polymer is a lithium ion conductive porous polymer electrolyte.

2. A nonaqueous polymer cell according to claim 1, wherein said lithium ion conductive porous polymer has a porosity in the range of 10% to 80%.

3. A nonaqueous polymer cell according to claim 2, wherein said first nonaqueous electrolyte contains a lithium salt and is held in pores of said lithium ion conductive porous polymer.

4. A nonaqueous polymer cell according to claim 3, wherein said lithium ion conductive porous polymer is produced by a method comprising the steps of:

dissolving an organic polymer into a first solvent to prepare a solution; and removing said first solvent from said solution using a second solvent incompatible with said organic polymer and compatible with said first solvent.

5. A nonaqueous polymer cell according to claim 4, wherein said lithium ion conductive porous polymer is a porous polymer electrolyte in which a second non-aqueous electrolyte is infiltrated into both said organic polymer and pores thereof.

6. A nonaqueous polymer cell according to claim 5, wherein said organic polymer comprises at least one of polyvinylidene fluoride, polyvinyl chloride, polyacrylonitrile and a copolymer containing any of these polymers.

7. A nonaqueous polymer cell according to claim 1, wherein an active material layer of at least one of said positive electrode and said negative electrode includes said lithium ion conductive porous polymer.

8. A nonaqueous polymer cell according to claim 7, wherein said lithium ion conductive porous polymer has a porosity in the range of 10% to 80%.

9. A nonaqueous polymer cell according to claim 7, wherein pores of said active material layer of at least one of said positive electrode and said negative electrode are filled with said lithium ion conductive porous polymer.

10. A nonaqueous polymer cell according to claim 9, wherein said lithium ion conductive porous polymer has a porosity in the range of 10% to 80%.

11. A nonaqueous polymer cell according to claim 7, wherein said lithium ion porous polymer is arranged between said positive electrode and said negative electrode.

12. A nonaqueous polymer cell according to claim 1, wherein an active material of at least one of said positive electrode and said negative electrode includes a material which expands and contracts upon charge/discharge process.

13. A nonaqueous polymer cell according to claim 12, wherein said lithium ion porous polymer is provided between said positive electrode and said negative electrode.

14. A nonaqueous polymer cell according to claim 1, wherein said positive electrode includes lithium.

15. A nonaqueous polymer cell according to claim 1, wherein said negative electrode includes lithium.

16. A nonaqueous polymer cell according to claim 1, wherein said negative electrode includes graphite.

17. A nonaqueous polymer cell according to claim 3, wherein an active material of at least one of said positive electrode and said negative electrode includes a material which expands and contracts upon charge/discharge process.

18. A nonaqueous polymer cell according to claim 17, wherein said lithium ion porous polymer is provided between said positive electrode and said negative electrode.

19. A nonaqueous polymer cell according to claim 3, wherein said positive electrode includes lithium.

20. A nonaqueous polymer cell according to claim 3, wherein said negative electrode includes lithium.

21. A nonaqueous polymer cell according to claim 3, wherein said negative electrode includes graphite.

22. A nonaqueous polymer cell according to claim 7, wherein an active material of at least one of said positive electrode and said negative electrode includes a material which expands and contracts upon charge/discharge process.

23. A nonaqueous polymer cell according to claim 22, wherein said lithium ion porous polymer is provided between said positive electrode and said negative electrode.

24. A nonaqueous polymer cell according to claim 7, wherein said positive electrode includes lithium.

25. A nonaqueous polymer cell according to claim 7, wherein said negative electrode includes lithium.

26. A nonaqueous polymer cell according to claim 7, wherein said negative electrode includes graphite.

* * * * *